U
United States Patent

[11] 3,622,350

| [72] | Inventor | Paul A. Hammes |
| | | Westfield, N.J. |
| [21] | Appl. No. | 823,992 |
| [22] | Filed | May 12, 1969 |
| [45] | Patented | Nov. 23, 1971 |
| [73] | Assignee | Merck & Co., Inc. |
| | | Rahway, N.J. |

[54] PROCESS OF COATING TABLE SALT
1 Claim, No Drawings

[52] U.S. Cl. ..................................... 99/143, 99/166
[51] Int. Cl. ........................................ A23l 1/22
[50] Field of Search........................................ 99/166, 169, 143, 159, 222, 140

[56] References Cited
UNITED STATES PATENTS

| 3,096,248 | 7/1963 | Rudzki ......................... | 99/166 X |
| 3,245,808 | 4/1966 | Farkas et al. ................. | 99/222 |
| 3,471,303 | 10/1969 | Hamdy et al................. | 99/166 |

*Primary Examiner*—Hyman Lord
*Attorneys*—Raymond Underwood, Harry E. Westlake and I. Louis Wolk ABSTRACT: Table salt and like small particulate food materials are enclosed in a coating of ethylcellulose having a viscosity of 4 to 50 and an ethyoxyl content of 45.5 to 49.5 percent, the coating serving to protect the coated material from water but being removable or made permeable in gastrointestinal fluids.

PROCESS OF COATING TABLE SALT

This invention relates to coatings for food particles of small granular size such as salt, pepper and other condiments, as well as other particulate food materials which will be mentioned.

Table salt is one example of a food material of small particle size which can advantageously be enclosed in a water insoluble coating, the coating, however, being of a material which is removed by gastrointestinal fluids. In the manufacture of bread and other bakery products, for instance, free table salt has an inhibiting action on yeast and interferes with its raising action. To overcome this it has been necessary to add an excess of yeast. An additional advantage of the coated salt particles is that the salt is released gradually and its flavor is prolonged without requiring an increased amount in the mix.

The substitution in bakery dough of the coated salt particles of this invention, for all or a major portion of the free salt ordinarily used, introduces no problem. A smaller relative amount of the coated salt will suffice but the conventional mixing subdividing, and baking operations will remain the same.

In accordance with the present invention it has been disclosed that ethylcellulose of an ethoxyl content of 45.5 to 49.5 percent (preferably 48.0 to 49.5 percent) and a viscosity (as determined by Dow and Hercules methods) within the range of 4 to 50 (preferably 7 to 14) is to be used as the coating material. Suitable materials are Dow's Ethocel, and Hercules' Ethylcellulose. They dissolve in acetone to form a white, slightly opalescent solution and films can be cast from a 6 percent solution, the film forming as the solvent evaporates. The polymer will also dissolve in acetone, ethanol, their water mixtures, and an acetone-ethanol mixture, among others. To evaluate the suitability of this ethylcellulose the following test was carried out:

a. A solution (I) was prepared of 3.68 ethylcellulose (above identified) in 114.3 ml. acetone. (I) was cast on glass to yield a transparent film. When water was added to 10 ml. of (I) with stirring, a cloud precipitated out after about 2 ml. had been added.

b. A clear solution was prepared (II) using 10 ml. (I) and 1.0 ml. water. (II) was cast on glass yielding a transparent film that was not as strong as that from (I).

c. S.D.A. denatured alcohol 23-A was prepared by blending 100 ml. ethanol (200 proof) and 10 ml. acetone. 2.68 ethylcellulose was dissolved in the denatured alcohol to form a clear solution (III). (III) was cast on glass to yield a clear film of much lower strength than that from (II).

d. Various other combinations of ethanol and acetone were evaluated. Any combination involving greater than 50 percent ethanol led to a very weak film. Twenty-five percent ethanol led to a fairly strong film. Acetone as the sole solvent gave the strongest film.

This ethylcellulose is uniquely suitable for this purpose because it satisfies the necessary requirement, namely:

1. The material must meet F and DA food grade standards.
2. The material must be insoluble in water so that it is not removed by the water present in the mix containing it.
3. The material must be soluble in organic solvent, or in an aqueous organic solvent.
4. The volatility of the organic solvent must be such that the solvent is easily blown off.
5. The solvent must meet F and DA food grade standards.
6. The coating material, solvent system must not cause clumping of the food particles in the coating process.
7. The coating must be substantially water impervious to prevent loss of the enveloped salt particles during the steps of mixing it, during subsequent standing or cooking the mixture.
8. The coating must have no or an acceptable taste.
9. The coating must be removed or become permeable in gastrointestinal fluids.
10. The coating must be readily obtainable at a low price.

The invention is illustrated by the following representative example:

EXAMPLE I

The materials used are:

| | |
|---|---|
| Ethylcellulose, viscosity 10, ethoxy content 48.0 to 49.5% | 73.6 g. |
| Salt (sodium chloride), granular | 3,300 g. |
| Acetone | 868 cc. |

1. Dissolve the ethylcellulose in the acetone. 2. Charge a coating pan with the salt and start the pan rotating.

3. Pour the ethylcellulose solution on the salt in 64–94 cc. portions. The pour should take about 2 minutes. Allow 10 to 20 minutes for drying between each addition. As a consequence the individual salt granules have a continuous film thereon comprising a plurality of individual coatings of ethylcellulose. When all the suspension has been added, allow 40 to 60 minutes for drying.

4. Spread the coated salt to dry at room temperature for at least 24 hours.

This salt will be useful to flavor dough in normal backing procedures. On the other hand, it will not, as salt usually does, increase mixing requirements, decrease absorption, or inhibit yeast or enzyme action. These advantages result from a gradual release of sodium chloride from its coating in the presence of moisture.

In this example 1 the ethylcellulose amounts to 2.25 percent of the salt but the invention contemplates that the ethylcellulose may be from 1.0 to 5.0 percent of the salt weight. The coating which is formed on the salt serves the protective purpose mentioned above and also permits subsequent leaching out of the salt or its exposure in the gastrointestinal juices. In this example 1 the ethylcellulose constitutes 8.5 percent w./v. of the solvent but smaller amounts may be used down to about 3.5 g. i.e. about 4 percent of the solvent volume.

The invention has been disclosed above with particular reference to table salt but this is only because it is representative of the food materials of particulate size to which the invention may be applied. Pepper and spices and other condiments may be coated as in example 1, and this would be for the purpose of protecting persons who are sensitive to these food materials. In other words, the invention is useful in situations where general food masking is desirable. Examples are the following:

EXAMPLE II

The process of example I is followed, but pepper, paprika or other spices are coated to protect sensitive people from their direct effects.

EXAMPLE III

Example I is followed, but food acids, such as citric, fumaric, etc., are used. The coated materials are included with foods to be chewed so as to provide taste masking.

Another illustration of a useful application of the invention is in the meat-curing art. It is common practice to add nitrites and ascorbates in curing meats and the invention includes the coating of these materials. This is shown by the following example.

EXAMPLE IV

Example I is followed, using nitrite salts or ascorbates which are commonly used in meat curing. They will be gradually released with advantageous control of curing.

The invention additionally includes this coating technique to prevent physical contact of chemically reactive or incompatible substances. For instance in making a preparation which is to effervesce in the presence of water, such as a dry acid and sodium or potassium bicarbonate, one of these rectants may be coated so that it is protected against the action of the other.

Illustrative of this is the following:

EXAMPLE V

After coating either (or both) the bicarbonate or the acid (such as citric acid) they may be combined in a mixture which can be exposed to atmospheric humidity without fear of a reaction and loss of subsequent effervescence when immediately stirred in water.

Instead of the particular ethylcellulose called for in the examples of the invention, those having an ethoxy content and a viscosity content within the ranges mentioned above, may be substituted.

What is claimed is:

1. The process of coating table salt to overcome its inhibiting action on yeast when both are in a bakery dough, consisting of charging table salt in a rotatable coating pan; dissolving ethylcellulose in a solvent selected from the group consisting of acetone, ethanol, their mixtures and their water mixtures to thereby form a solution; said ethylcellulose having a viscosity of 4 to 50 and an ethoxy content of 45.5 to 49.5 percent said ethylcellulose constituting 4 to 8.5 percent w./v. of the solvent, and said ethylcellulose amounting to 1.0 to 5.0 percent of the salt weight; rotating the pan and then pouring said solution onto the table salt, said pouring being in portions with drying between each addition and said additions being repeated until a continuous film is formed on said table salt; and then drying the coated salt.

* * * * *